(12) United States Patent
Pfeifer

(10) Patent No.: US 11,876,440 B2
(45) Date of Patent: Jan. 16, 2024

(54) FAULT-TOLERANT OPERATION OF A CURRENT CONVERTER

(71) Applicant: Siemens Aktiengesellschaft, Munich (DE)

(72) Inventor: Markus Pfeifer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/020,864

(22) PCT Filed: Jun. 25, 2021

(86) PCT No.: PCT/EP2021/067449
§ 371 (c)(1),
(2) Date: Feb. 10, 2023

(87) PCT Pub. No.: WO2022/033755
PCT Pub. Date: Feb. 17, 2022

(65) Prior Publication Data
US 2023/0246540 A1 Aug. 3, 2023

(30) Foreign Application Priority Data

Aug. 12, 2020 (EP) .................................. 20190711

(51) Int. Cl.
*H02M 1/32* (2007.01)
*H02M 7/219* (2006.01)
(52) U.S. Cl.
CPC .......... *H02M 1/325* (2021.05); *H02M 7/219* (2013.01)

(58) Field of Classification Search
CPC ............................. H02M 1/323; H02M 1/325
See application file for complete search history.

(56) References Cited

U.S. PATENT DOCUMENTS

| 9,178,410 B2* | 11/2015 | Schelenz ................ H02J 3/381 |
| 2013/0026550 A1 | 1/2013 | Yoshioka |
| 2014/0098581 A1 | 4/2014 | Takizawa |

(Continued)

FOREIGN PATENT DOCUMENTS

| CN | 102903715 A | 1/2013 |
| CN | 103715874 A | 4/2014 |

(Continued)

OTHER PUBLICATIONS

PCT International Search Report and Written Opinion of International Searching Authority dated Oct. 22, 2021 corresponding to PCT International Application No. PCT/EP2021/067449 filed Jun. 25, 2021.

*Primary Examiner* — Gustavo A Rosario-Benitez
(74) *Attorney, Agent, or Firm* — Henry M. Feiereisen LLC

(57) ABSTRACT

A method for operating an electronic module which includes at least three semiconductor elements is disclosed. In the event of a defect of one of the semiconductor elements, by targeted control of at least two of the other semiconductor elements, a current is conducted via the defective semiconductor element in order to destroy or disconnect the defective semiconductor element or a weak point associated with the defective semiconductor element. This current is distributed to the semiconductor elements which are controlled in a targeted manner.

8 Claims, 2 Drawing Sheets

(56) References Cited

U.S. PATENT DOCUMENTS

| | | | |
|---|---|---|---|
| 2015/0303839 A1* | 10/2015 | Ueno | H02P 29/027 |
| | | | 318/400.22 |
| 2016/0211740 A1* | 7/2016 | Schueler | H02P 9/14 |
| 2016/0322893 A1* | 11/2016 | Schinzel | H02M 1/088 |
| 2016/0365787 A1* | 12/2016 | Geske | H02M 7/4835 |
| 2017/0170715 A1* | 6/2017 | Sathik | H02M 7/53871 |
| 2017/0197509 A1 | 7/2017 | Lehnert et al. | |
| 2017/0197730 A1* | 7/2017 | Lutze | B64D 27/24 |
| 2018/0145580 A1 | 5/2018 | Lutze | |
| 2021/0226571 A1 | 7/2021 | Lengenfelder | |
| 2021/0249947 A1* | 8/2021 | Geske | H02M 1/32 |
| 2022/0006286 A1* | 1/2022 | Li | H02H 7/268 |

FOREIGN PATENT DOCUMENTS

| | | |
|---|---|---|
| CN | 203951357 U | 11/2014 |
| DE | 102017218189 A1 | 4/2019 |
| WO | WO 2016005092 A1 | 1/2016 |
| WO | WO 2016169817 A1 | 10/2016 |

* cited by examiner

US 11,876,440 B2

FAULT-TOLERANT OPERATION OF A CURRENT CONVERTER

CROSS-REFERENCES TO RELATED APPLICATIONS

This application is the U.S. National Stage of International Application No. PCT/EP2021/067449, filed Jun. 25, 2021, which designated the United States and has been published as International Publication No. WO 2022/033755 A1 and which claims the priority of European Patent Application, Serial No. 20190711.00, filed Aug. 12, 2020, pursuant to 35 U.S.C. 119(a)-(d).

BACKGROUND OF THE INVENTION

The invention relates to a method for operating an electronic module and to a device comprising an electronic module.

Electronic modules, e.g. converters, rectifiers or inverters, comprising a plurality of semiconductor elements, in particular power semiconductor elements, cannot normally remain operable if one of the semiconductor elements is defective. This can result in significant downtime costs.

Published unexamined German patent application WO 2016 005 092 A1 describes a converter having a DC link for providing a DC voltage between a positive line and a negative line, a phase line for receiving and/or outputting an AC voltage, and a half-bridge circuit with a first switch arrangement for connecting the positive line to the phase line and a second switch arrangement for connecting the negative line to the phase line. In the event of a defect in a semiconductor switch of the converter, the converter shall be able to protect itself and remain operable. For this purpose, the first switch arrangement and the second switch arrangement each have a parallel connection comprising a plurality of switching branches, and one of the semiconductor switches having its own fuse connected in series with the contact gap of the semiconductor switch is provided in each switching branch.

Published unexamined German patent application WO 2016 169 817 A1 describes a method for controlling a converter, wherein a positive line and a negative line of a DC link are each connected to an AC phase conductor by a half bridge via a plurality of semiconductor switches, wherein each semiconductor switch has its own fuse connected in series. The converter is designed to respond robustly in the event of a continuous short circuit through one of the semiconductor switches. For this purpose, the method involves detecting the defective semiconductor switch, which remains continuously in an electrically conductive state, and progressively melting the fuse of the defective semiconductor switch by repeatedly short-circuiting the positive line and the negative line together via the defective semiconductor switch and via at least two other of the semiconductor switches. Each short circuit lasts only one pulse duration which is smaller than the operating time required to melt the fuse in the event of a continuous short circuit.

Published unexamined German patent application DE 10 2017 218 189 A1 describes an inverter which is designed to control an electrical machine connected to a voltage source having a first and a second potential. Here, the inverter comprises a plurality of bridge circuits, each comprising a first current valve, a second current valve and a connection for the electrical machine, and a first interface for receiving individual control signals for the current valves and a second interface for detecting a shutdown signal. Each first current valve is designed to control current between the high electrical potential and the associated connection, and each second current valve is designed to control current between the associated connection and the low electrical potential. A shutdown means is designed to close either all the first or all the second current valves in response to the shutdown signal and irrespective of signals at the first interface.

The object of the invention is to provide an improved method for operating an electronic module and an improved device comprising an electronic module.

SUMMARY OF THE INVENTION

This object is achieved according to the invention by a method as set forth hereinafter, and by a device as set forth hereinafter.

Advantageous embodiments of the invention are set forth in the sub-claims.

In a method according to the invention for operating an electronic module comprising at least three semiconductor elements, in the event of a defect in one of the semiconductor elements, a current is passed via the defective semiconductor element by selectively activating at least two of the remaining semiconductor elements in order to destroy or open-circuit the defective semiconductor element or a weak point associated therewith, wherein this current is distributed to the selectively activated semiconductor elements.

With the semiconductor element thus open-circuited, the module can initially continue to operate, possibly not at full capacity, since not all the switching patterns are available. However, partial load operation remains possible.

The semiconductor elements can be designed, for example, as semiconductor switches, in particular field-effect transistors, bipolar transistors, IGBTs, thyristors, or as diodes, etc. The semiconductor switches can be e.g. pulse width modulation controlled.

The electronic module further comprises at least six semiconductor elements disposed in three half-bridges, each having an upper branch and a lower branch.

In addition, if one of the semiconductor elements in the upper branch in one of the half bridges is defective, the two semiconductor elements in the upper branch of the other two half bridges are selectively activated to destroy or open circuit the defective semiconductor element or the weak point associated therewith, wherein if one of the semiconductor elements in the lower branch in one of the half bridges is defective, the two semiconductor elements in the lower branch of the other two half bridges are selectively activated to destroy or open-circuit the defective semiconductor element or the weak point associated therewith.

In one embodiment, the method is used to operate an electronic module designed to rectify or convert a three-phase AC voltage.

In one embodiment, the two semiconductor elements are selectively activated at a time when the voltage ratios present on the respective phases not affected by the defective semiconductor element are the same as on the phase affected by the defective semiconductor element, or within a tolerance range around said time when said voltage ratios are broadly the same, in particular when there is a voltage difference of less than 4 volts between the phases not affected by the defective semiconductor element and the phase affected by the defective semiconductor element.

In one embodiment, the two semiconductor elements on the respective phases not affected by the defective semiconductor element are turned on at the said time, so that a short-circuit current flows which is divided between the two semiconductor elements, while the full short-circuit current flows via the defective semiconductor element. This ensures complete destruction or open-circuiting of the defective semiconductor element or the weak point associated therewith, while keeping the remaining semiconductor elements operational.

In one embodiment, the selective activation of the two semiconductor elements is repeated until the defective semiconductor element or the weak point associated therewith is destroyed or open-circuited, in particular if the intended destruction or open-circuiting does not occur after one activation. The process is therefore repeated under the same conditions until the intended destruction or open-circuiting occurs, so that a short-circuit current no longer flows through the defective semiconductor element.

A device according to one aspect of the present invention comprises an electronic module comprising at least three semiconductor elements, and a control device designed to detect defects in the semiconductor elements and to perform the method as claimed in one of the preceding claims to destroy or open-circuit a defective semiconductor element or a weak point associated therewith.

In one embodiment, the weak point is designed as a bond wire of the semiconductor element, sized so as to carry a predetermined operating current and a current exceeding it within a predetermined limit, but not a short-circuit current or a repeatedly applied short-circuit current.

In one embodiment, the weak point is alternatively or additionally designed as a narrowing of a copper layer at a connection of the semiconductor element on a printed circuit board (in particular DCB or PCB).

The above-described characteristics, features and advantages of the present invention, as well as the manner in which they are achieved, will become clearer and more readily understood in connection with the following description of exemplary embodiments which will be explained in more detail with reference to the accompanying drawings in which:

DETAILED DESCRIPTION OF PREFERRED EMBODIMENTS

Figure 1:
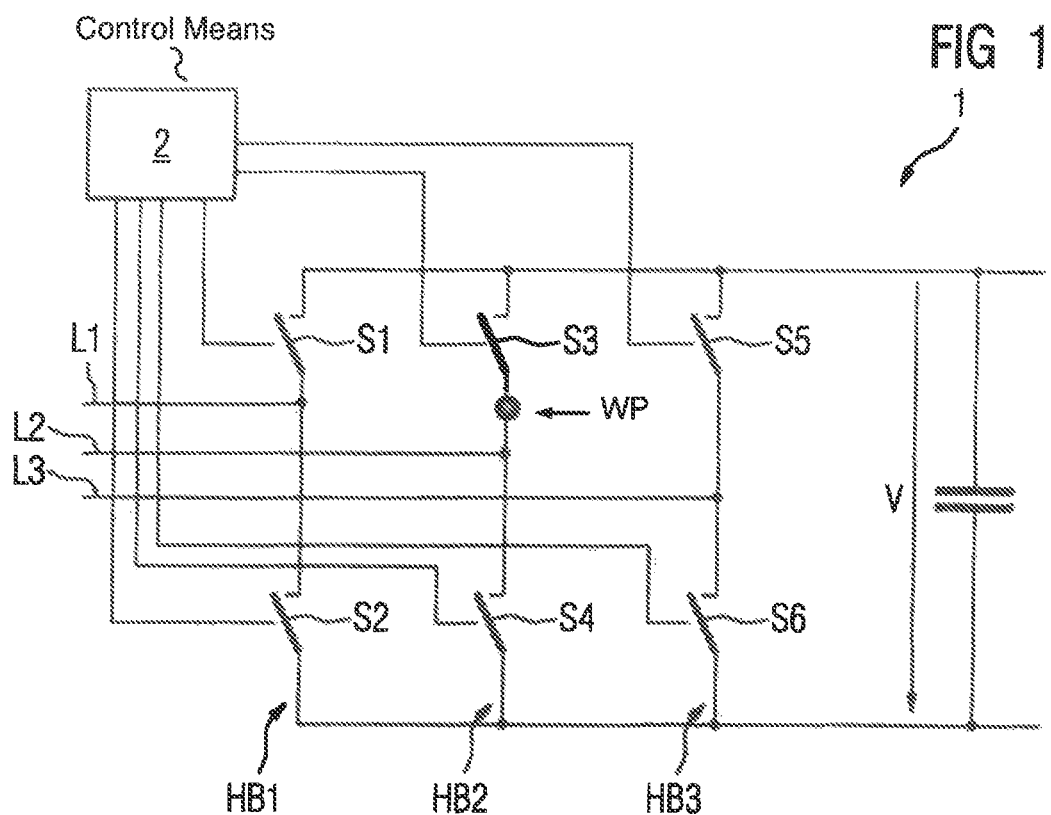
FIG. 1 shows a schematic diagram of a module having a plurality of semiconductor elements, and FIG. 2 schematically illustrates a three-phase AC voltage.

In the figures, mutually corresponding parts are denoted by the same reference characters.

FIG. 1 is a schematic diagram of a module 1, e.g. a converter module, having a plurality of semiconductor elements S1 to S6 which can be selectively activated by means of a control means 2. The module 1 is designed, for example, as a converter module for converting a three-phase AC voltage comprising phases L1, L2, and L3 initially into a DC voltage V. In this case, the semiconductor elements S1 to S6 are implemented e.g. as semiconductor switches, in particular field-effect transistors, bipolar transistors, IGBTs, thyristors or as diodes, etc., and are arranged in three half-bridges HB1 to HB3. The semiconductor switches can be activated, for example, by a control means 2 using pulse width modulation.

If, in a conventional module 1, one of the semiconductor elements S1 to S6 is defective, e.g. the semiconductor element S3 in the upper branch of the half-bridge HB2, continued operation of the module 1 is not possible. As a result, significant downtime costs may be incurred.

According to the present invention, a weak point WP for the semiconductor element S3, in particular a weak point for each of the semiconductor elements S1 to S6, can be selectively provided in the module 1. Alternatively or additionally, a defective semiconductor element S1 to S6, e.g. the semiconductor element S3, can be rendered inoperative by means of selective modulation. In this way, partial operation of the module 1 remains possible. The manner in which the modulation is performed will be described below.

Figure 2:
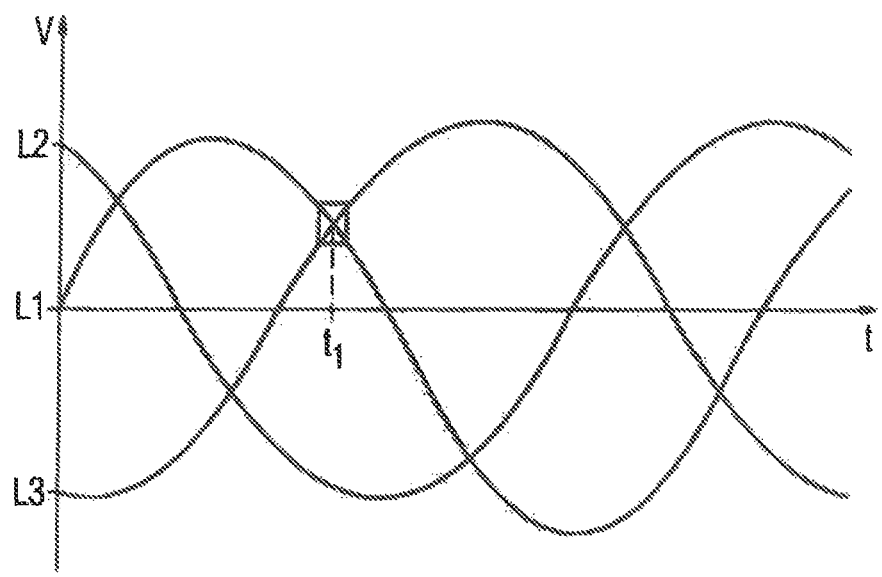

FIG. 2 is a schematic waveform diagram of the three-phase AC voltage applied to phases L1, L2, L3, wherein the voltage V is plotted versus time t. The defective semiconductor element S3, together with semiconductor element S4, is used to rectify the AC voltage of phase L2. At a time t1, the voltage ratios present on the semiconductor elements S1 and S5 in the upper branch of the half bridges HB1 and HB3, i.e. on the phases L1 and L3, are the same as on L2 and therefore as on the defective semiconductor element S3. The semiconductor elements S1 and S5 are turned on at time t1 or within a tolerance range around time t1 in which the said voltage ratios are largely equal, so that a short-circuit current flows which is divided between the semiconductor elements S1 and S5, while the full short-circuit current flows via the defective semiconductor element S3. The objective is to completely destroy or open-circuit the defective semiconductor element S3 or a weak point associated therewith while keeping the remaining semiconductor elements S1, S2, S4 to S6 operable. If the intended destruction or open-circuiting does not occur during this activation, the process can be repeated under the same conditions until the intended destruction or open-circuiting occurs so that no short-circuit current flows through the defective semiconductor element S3. With the semiconductor element S3 disrupted in this way, the module 1 can initially continue to be operated, possibly not at full output, since not all the switching patterns are available. However, partial load operation remains possible.

Figure 3:
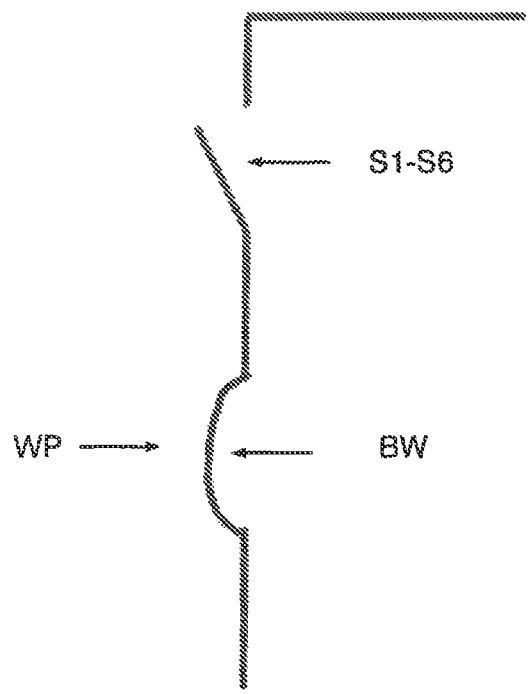
FIG. 3 schematically illustrates an embodiment of a weak point.
Figure 4:
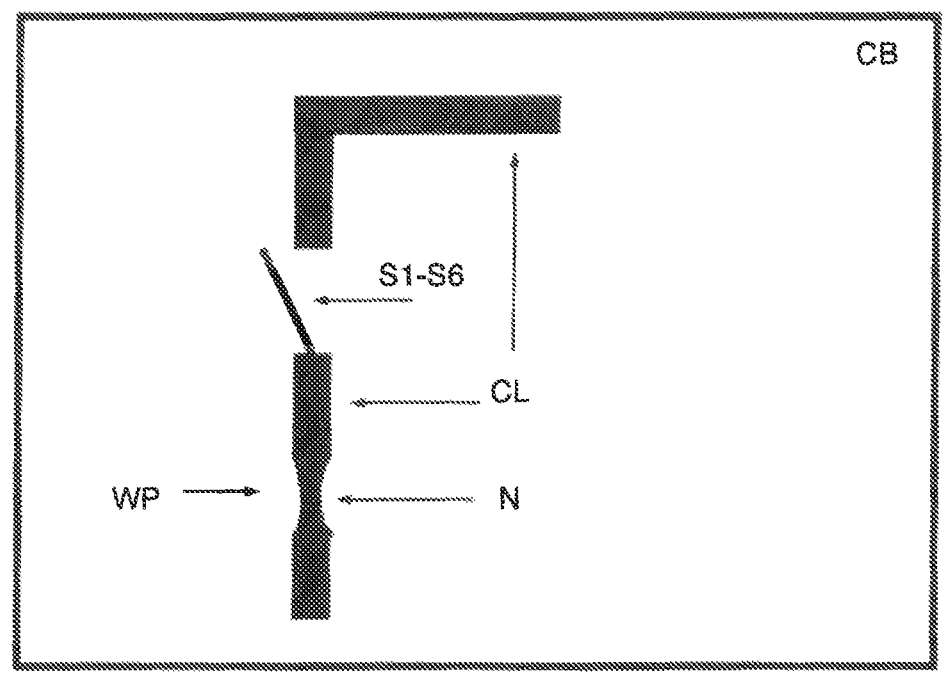
FIG. 4 schematically illustrates another embodiment of a weak point.

As seen in FIG. 3, the weak point WP can be, for example, a bond wire BW of the semiconductor element S1 to S6, designed to carry a predetermined operating current and a current exceeding it within a predetermined limit, e.g. a particular multiple of the predetermined operating current, but not the short-circuit current or the repeatedly applied short-circuit current. Similarly, as is seen in FIG. 4, the weak point WP can be designed as a narrowing N of a copper layer CL at the connection of the semiconductor element S1 to S6 on a printed circuit board CB (particularly DCB or PCB).

Although the invention has been illustrated and described in more detail by preferred exemplary embodiments, the invention is not limited by the examples disclosed and other variations will be apparent to persons skilled in the art without departing from the scope of protection sought for the invention.

The invention claimed is:

1. A method for operating an electronic module comprising at least three semiconductor elements, the electronic module comprising at least six semiconductor elements disposed in three half-bridges, each having an upper branch and a lower branch, the method comprising:

passing a current, in the event of a defect in one of the semiconductor elements, via the defective semiconductor element by selectively activating at least two of the remaining semiconductor elements in order to destroy or open-circuit the defective semiconductor element or a weak point associated with the defective semiconductor element, wherein this current is distributed between the selectively activated semiconductor elements;

selectively actuating, in the event of a defect in one of the semiconductor elements in the upper branch in one of the half-bridges, the two semiconductor elements in the upper branch of the other two half-bridges in order to destroy or open-circuit the defective semiconductor element or the weak point associated with the defective semiconductor element; and selectively actuating, in the event of a defect in one of the semiconductor elements in the lower branch in one of the half-bridges, the two semiconductor elements in the lower branch of the other two half-bridges in order to destroy or open-circuit the defective semiconductor element or the weak point associated with the defective semiconductor element.

2. The method of claim 1, further comprising operating an electronic module designed to rectify or convert an AC voltage having three phases.

3. The method of claim 1, further comprising selectively activating the two semiconductor elements at a time at which voltage ratios present on the respective phases not affected by the defective semiconductor element are the same as on the phase affected by the defective semiconductor element, or within a tolerance range around said time when said voltage ratios are substantially equal.

4. The method of claim 3, further comprising activating the two semiconductor elements on the respective phases not affected by the defective semiconductor element at the time so that a short-circuit current flows which is divided between the two semiconductor elements, while the full short-circuit current flows via the defective semiconductor element.

5. The method of the claim 1, further comprising repeating the selective activation of the two semiconductor elements until the defective semiconductor element or the weak point associated with the defective semiconductor element is destroyed or open-circuited.

6. A device comprising:
an electronic module comprising at least three semiconductor elements, the electronic module comprising at least six semiconductor elements disposed in three half-bridges, each having an upper branch and a lower branch; and
a control device designed to detect defects in the semiconductor elements and configured to pass a current, in the event of a defect, in one of the semiconductor elements, via the defective semiconductor element by selectively activating at least two of the remaining semiconductor elements in order to destroy or open-circuit the defective semiconductor element or a weak point associated with the defective semiconductor element, wherein this current is distributed between the selectively activated semiconductor elements; selectively actuate, in the event of a defect in one of the semiconductor elements in the upper branch in one of the half-bridges, the two semiconductor elements in the upper branch of the other two half-bridges in order to destroy or open-circuit the defective semiconductor element or the weak point associated with the defective semiconductor element; and selectively actuate, in the event of a defect in one of the semiconductor elements in the lower branch in one of the half-bridges, the two semiconductor elements in the lower branch of the other two half-bridges in order to destroy or open-circuit the defective semiconductor element or the weak point associated with the defective semiconductor element.

7. The device of claim 6, wherein the weak point is designed as a bond wire of the semiconductor element, sized so as to carry a predetermined operating current and a current exceeding it within a predetermined limit, but not a short-circuit current or a repeatedly applied short-circuit current.

8. The device of claim 6, wherein the weak point is designed as a narrowing of a copper layer at a connection of the semiconductor element on a printed circuit board.

* * * * *